United States Patent
Nakano et al.

(10) Patent No.: US 7,526,200 B2
(45) Date of Patent: Apr. 28, 2009

(54) WAVELENGTH-DIVISION MULTIPLEXING OPTICAL TRANSMITTER

(75) Inventors: Hiroyuki Nakano, Yokohama (JP); Yasuyuki Fukashiro, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 599 days.

(21) Appl. No.: 11/212,576

(22) Filed: Aug. 29, 2005

(65) Prior Publication Data

US 2006/0045520 A1  Mar. 2, 2006

(30) Foreign Application Priority Data

Aug. 31, 2004 (JP) ............... 2004-251525

(51) Int. Cl.
*H04B 10/08* (2006.01)

(52) U.S. Cl. ............... 398/34; 398/10; 398/14; 398/15; 398/22; 398/23; 398/33; 398/36

(58) Field of Classification Search .......... 398/1, 398/5, 7, 9–15, 17, 22, 23, 25, 33, 34, 36, 398/38, 66, 82, 83; 359/124, 127, 337, 337.11, 359/341, 341.42; 356/484

See application file for complete search history.

(56) References Cited

U.S. PATENT DOCUMENTS

| | | | | |
|---|---|---|---|---|
| 6,031,659 | A * | 2/2000 | Okiyama | 359/341.42 |
| 6,081,359 | A * | 6/2000 | Takehana et al. | 398/1 |
| 6,134,034 | A * | 10/2000 | Terahara | 398/1 |
| 6,172,782 | B1 * | 1/2001 | Kobayashi | 398/9 |
| 6,192,170 | B1 * | 2/2001 | Komatsu | 385/15 |
| 6,633,430 | B1 * | 10/2003 | Monnard et al. | 359/337.11 |
| 6,661,974 | B1 * | 12/2003 | Akiyama et al. | 398/95 |
| 7,038,843 | B2 * | 5/2006 | Denkin et al. | 359/337.11 |
| 2002/0145778 | A1 * | 10/2002 | Strasser et al. | 359/124 |
| 2003/0002104 | A1 * | 1/2003 | Caroli et al. | 359/127 |
| 2004/0114149 | A1 * | 6/2004 | Einstein et al. | 356/484 |
| 2004/0161232 | A1 * | 8/2004 | Kerfoot, III | 398/5 |
| 2005/0117907 | A1 * | 6/2005 | Claringburn et al. | 398/83 |
| 2005/0158048 | A1 * | 7/2005 | Sung et al. | 398/66 |
| 2006/0056842 | A1 * | 3/2006 | Li et al. | 398/12 |

FOREIGN PATENT DOCUMENTS

| | | | |
|---|---|---|---|
| JP | 2004-32088 | | 1/2004 |
| JP | 2004-032088 | * | 1/2004 |

OTHER PUBLICATIONS

Asymmetric Reconfigurable OADMs For Next Generation Metro-DWDM Networks, Viscardi et al, 2004, Society of America.

* cited by examiner

*Primary Examiner*—Kenneth N Vanderpuye
*Assistant Examiner*—Li Liu
(74) *Attorney, Agent, or Firm*—Antonelli, Terry, Stout & Kraus, LLP.

(57) ABSTRACT

An optical transmission apparatus includes optical transmitters for transmitting optical signals and first monitor units for monitoring optical signals from the optical transmitters. A multiplexer is provided for multiplexing the optical signals from the optical transmitters into a multiplexed signal. A second monitor unit is provided for monitoring each optical signal which is multiplexed in the multiplexed signal from the multiplexer. A processing unit is provided for comparing a first number of optical signals detected by the first monitor units and a second number of optical signals detected by the second monitor unit.

7 Claims, 9 Drawing Sheets

NUMBER OF WAVELENGTHS = n
NUMBER OF TRANSMITTED OPTICAL - SIGNAL = n

NUMBER OF WAVELENGTHS = n-1
NUMBER OF TRANSMITTED OPTICAL - SIGNAL = n (a) NUMBER OF WAVELENGTHS = NUMBER OF TRANSMITTED OPTICAL - SIGNALS (NORMAL)

(b) NUMBER OF WAVELENGTHS = NUMBER OF TRANSMITTED OPTICAL SIGNALS - 1 (ABNORMAL)

NUMBER OF WAVELENGTHS = n
NUMBER OF TRANSMITTED OPTICAL - SIGNALS = n

NUMBER OF WAVELENGTHS = n-1
NUMBER OF TRANSMITTED OPTICAL - SIGNALS = n (a) NUMBER OF WAVELENGTHS = NUMBER OF TRANSMITTED
                                OPTICAL - SIGNALS (NORMAL)

(b) NUMBER OF WAVELENGTHS = NUMBER OF TRANSMITTED
                                OPTICAL - SIGNALS - 1 (ABNORMAL)

FIG.9

| ID | WAVELENGTH | TIME | STATE |
|---|---|---|---|
| 001 | 1547.72 | 03/21/2005 03:12:30 | ON |
| 002 | 1548.51 | 08/20/2005 23:40:01 | ON |
| 003 | 1549.32 | 07/06/2005 09:54:44 | ON |
| 004 | 1550.12 | 08/16/2005 07:11:07 | ON |
| 005 | 1550.92 | 12/24/2004 22:14:00 | OFF |
| 006 | 1551.72 | 02/06/2005 10:34:20 | ON |
| 007 | 1552.52 | 08/20/2005 23:40:01 | ON |

# WAVELENGTH-DIVISION MULTIPLEXING OPTICAL TRANSMITTER

BACKGROUND OF THE INVENTION

1. Field of the Invention

The present invention relates to a wavelength-division multiplexing optical transmitter that combines and transmits a plurality of optical signals having different wavelengths.

2. Description of Related Art

The wavelength-division multiplexing (WDM) transmission method for combining and transmitting a plurality of optical signals, which have different wavelengths, over a single optical fiber has been widely adopted in practice as a technique effective in realizing a large data-carrying capacity optical fiber.

In order to combine a plurality of wavelengths, an optical multiplexer having a plurality of input ports capable of selecting a wavelength and a sole output port is generally employed. As the optical multiplexer, for example, an arrayed waveguide grating (AWG), a combination of dielectric multilayer filters, and a combination of fiber bragg gratings (FBG) are available. As for these types of optical multiplexers, components of light other than a component having a certain wavelength are filtered even when the light components fall on the optical multiplexer, and the signal level of the light decreases by a magnitude ranging from about 25 dB to about 30 dB. When an optical transmitter delivers a specific wavelength alone, the optical transmitter and an input port of the optical multiplexer associated with the delivered wavelength are related to each other on a one-to-one correspondence on a fixed basis.

On the other hand, a wavelength tunable optical transmitter capable of tuning a wavelength to be delivered from the optical transmitter has attracted attention these days. This is because not only the number of auxiliary optical transmitters that are needed in the same number as the number of wavelengths can be drastically reduced but also wavelengths can be routed using an optical switch or filter or the settings of light paths can be flexibly varied depending on a future change or growth in the configuration of a network. Thus, a highly efficient and reliable optical network can be constructed.

A wavelength-division multiplexing transmission method that employs a wavelength tunable optical transmitter as described in "Asymmetric Reconfigurable OADMs for Next-generation Metro-DWDM Networks" (by V. Viscardi and G. Barozzi, Optical Fiber Communication Conference, the Optical Society of America, Los Angeles, Calif., 2004, TuH3) will be described in conjunction with FIG. 2. FIG. 2 shows optical add/drop multiplexing (OADM) equipment that employs a plurality of wavelength tunable optical transmitters 11. On the light extraction (drop) stage, a branching filter 10 branches out a group of wavelengths including m wavelengths. Thereafter, a demultiplexer 22 separates signals having respective wavelengths, and m optical receivers 21 receive the optical signals having the wavelengths. On the light insertion (add) stage, a wavelength-division multiplexing transmitter that comprises m wavelength tunable optical transmitters 11, a wavelength-division multiplexing unit 12 that combines m wavelengths, and a optical coupler 24 transmits a resultant optical signal.

In the above configuration or the like, a method that adopts an optical coupler (also called an optical combiner), of which input ports 12a cannot select a wavelength, as the wavelength-division multiplexing unit 12 that is connected to the wavelength tunable optical transmitters 11 is adopted in order to combine any number of wavelengths. This is because when an optical multiplexer capable of selecting a wavelength is used to multiplex signals, it means that it is impossible to communicate light, of which wavelengths are changed, with the wavelength tunable optical transmitters left connected.

Incidentally, wavelength-division multiplexing to be performed by adopting a optical coupler whose input ports are incapable of selecting a wavelength is adapted to a case where the number of wavelengths to be combined is limited. This is because when the number of wavelengths to be combined is 32, the optical coupler induces an insertion loss per wavelength that is about 15 dB. In contrast, when an AWG whose input ports are capable of selecting a wavelength is employed in the wavelength-division multiplexing unit, the insertion loss is suppressed to a range from 3 dB to 5 dB per wavelength. When the wavelength-division multiplexing unit whose input ports can select a wavelength is used in combination with wavelength tunable optical transmitters, an optical switch must be interposed between them. The optical switch switches light paths when a wavelength assigned to any of the wavelength tunable optical transmitters is changed from one to another, allows an optical signal having the changed wavelength to pass, and thus introduces the optical signal to an input port.

Japanese Unexamined Patent Application Publication No. 2004-032088 describes a fiber incorrect coupling detection system to be installed in a wavelength-division multiplexing transmitter that comprises a plurality of wavelength-fixed transmitters and an optical multiplexer which has a plurality of input ports capable of selecting a wavelength and a single output port.

Assuming that wavelength tunable optical transmitters are employed and the number of wavelengths to be combined is small, a optical coupler whose input ports are incapable of selecting a wavelength is employed in a wavelength-division multiplexing unit so that wavelengths can be changed. When the optical coupler whose input ports are incapable of selecting a wavelength is adopted, even if optical signals having the same wavelength are incorrectly routed to a plurality of input ports or an optical transmitter that has failed because of a wavelength shift is connected, erroneous light is transmitted as wavelength-multiplexed light over a transmission line and received by an opposed receiver. Consequently, since the plurality of signals having the same wavelength is received simultaneously, communication is disabled.

Moreover, when wavelength tunable optical transmitters are connected to a wavelength-division multiplexing unit capable of selecting a wavelength, an optical switch must be used in combination in order to switch light paths at the time of changing wavelengths and to introduce an optical signal having a selected wavelength to an input port that allows the optical signal having the wavelength to pass. Even in this case, if the same wavelength is incorrectly routed to a plurality of input ports, an optical transmitter that has failed because of a wavelength shift is connected, or any of the settings of the optical switch are incorrectly determined, signal light interferes with other signal light. This poses a problem in that a signal which must be received is covered with noise (coherent crosstalk).

BRIEF DESCRIPTION OF THE DRAWINGS

FIG. 9 shows an example of information about optical transmitters.

DETAILED DESCRIPTION

Figure 1:
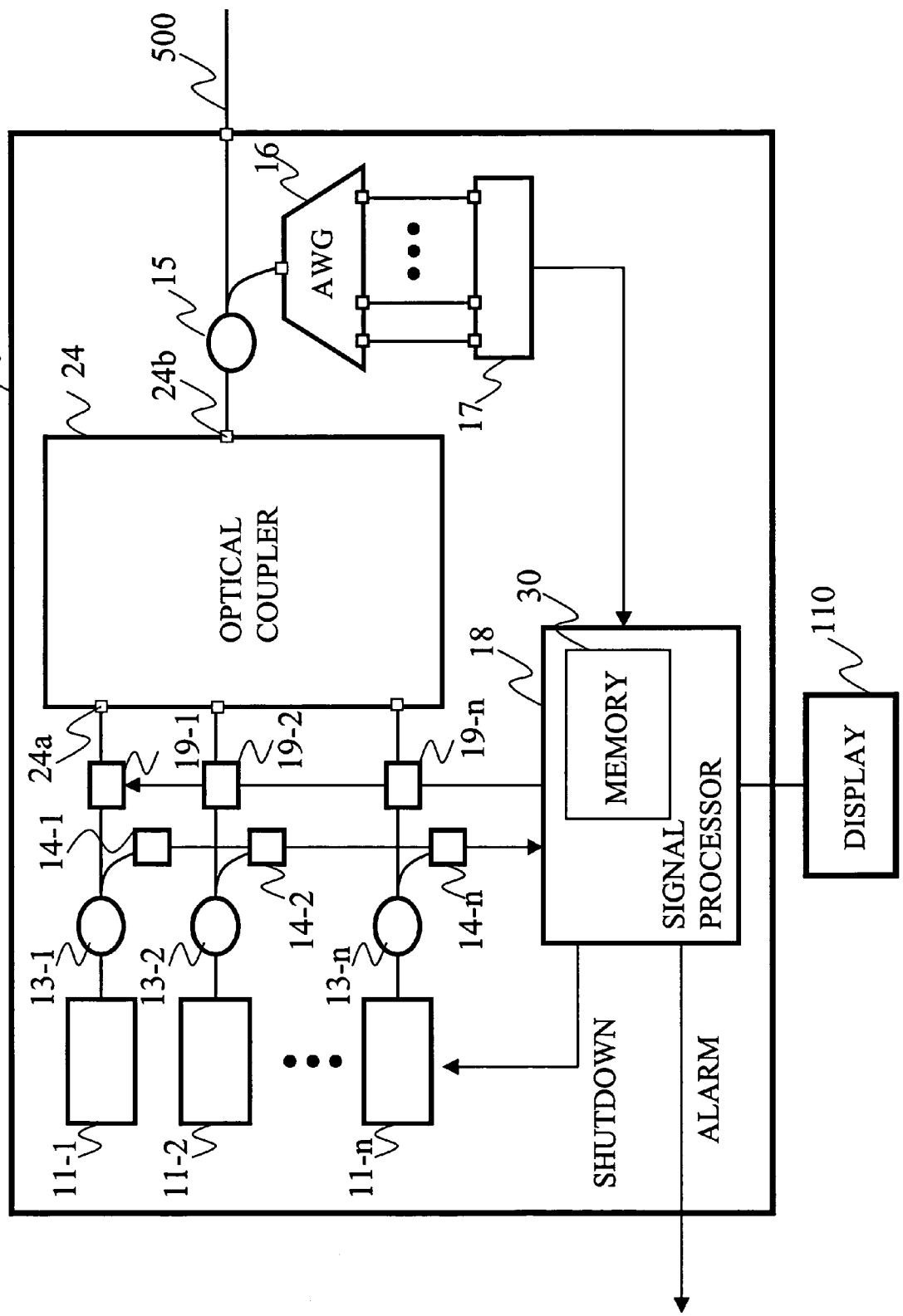
FIG. 1 shows a block diagram of a wavelength-division multiplexing optical transmitter explanatory of an embodiment of the present invention.
Figure 2:
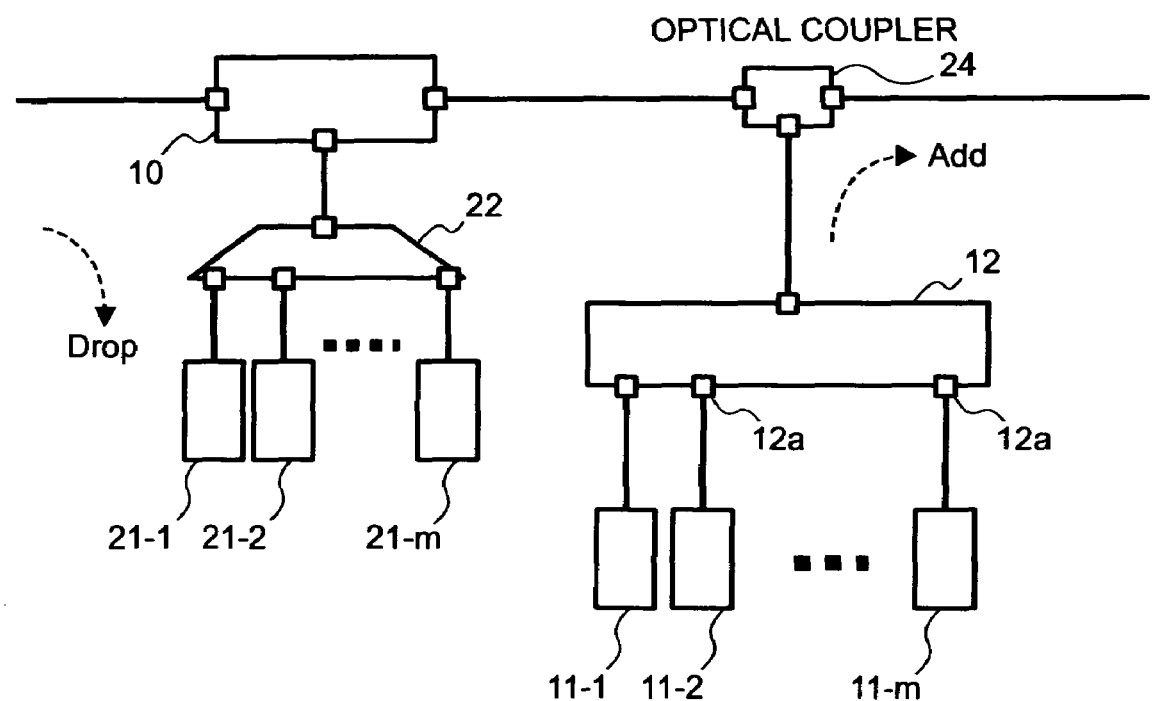
FIG. 2 shows the configuration of optical add/drop multiplexing equipment having a wavelength-division multiplexing transmission facility.

Before beginning a detailed description of the subject invention, mention of the following is in order. When appropriate, like reference numerals and characters may be used to designate identical, corresponding or similar components in differing figure drawings. Arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. In other instances, detailed descriptions of well-known methods and components are omitted so as not to obscure the description of the invention with unnecessary/excessive detail. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software. Example embodiments of the present invention will now be described hereinafter with reference to the drawings.

Figure 3:
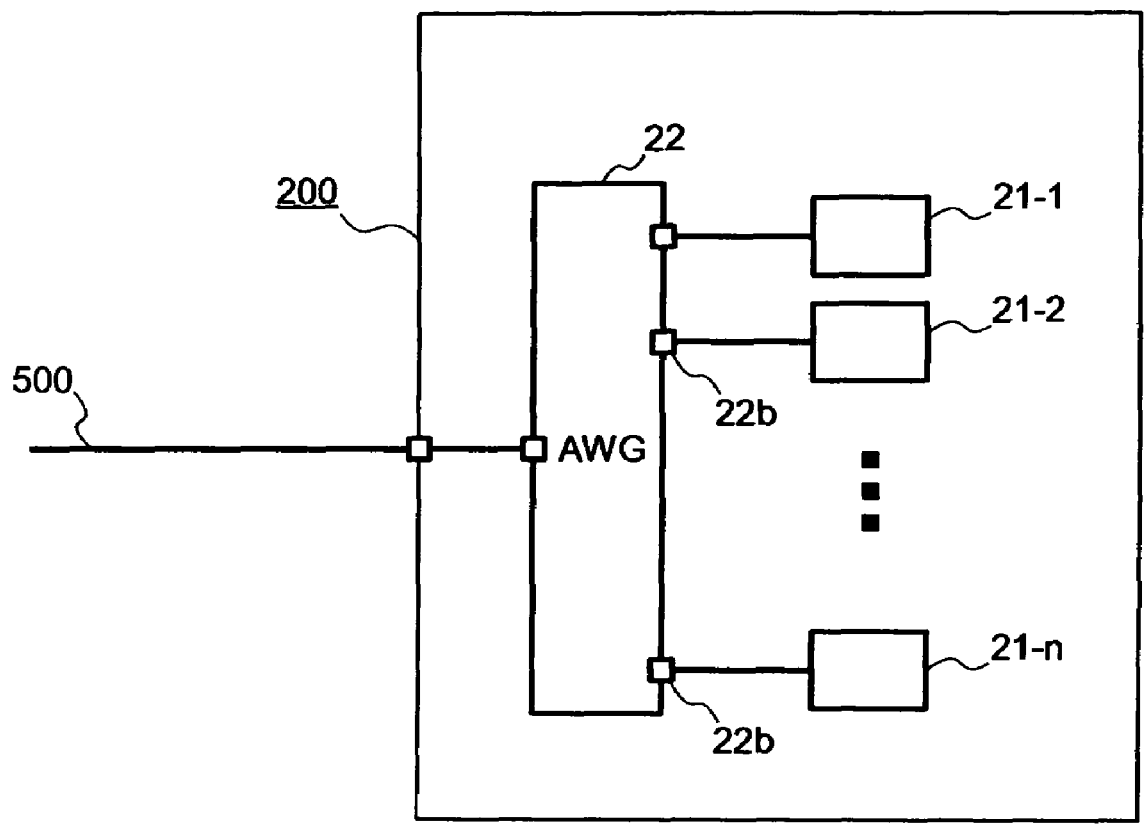
FIG. 3 shows a block diagram of a wavelength-division multiplexing optical receiver explanatory of the embodiment of the present invention.
Figure 8:
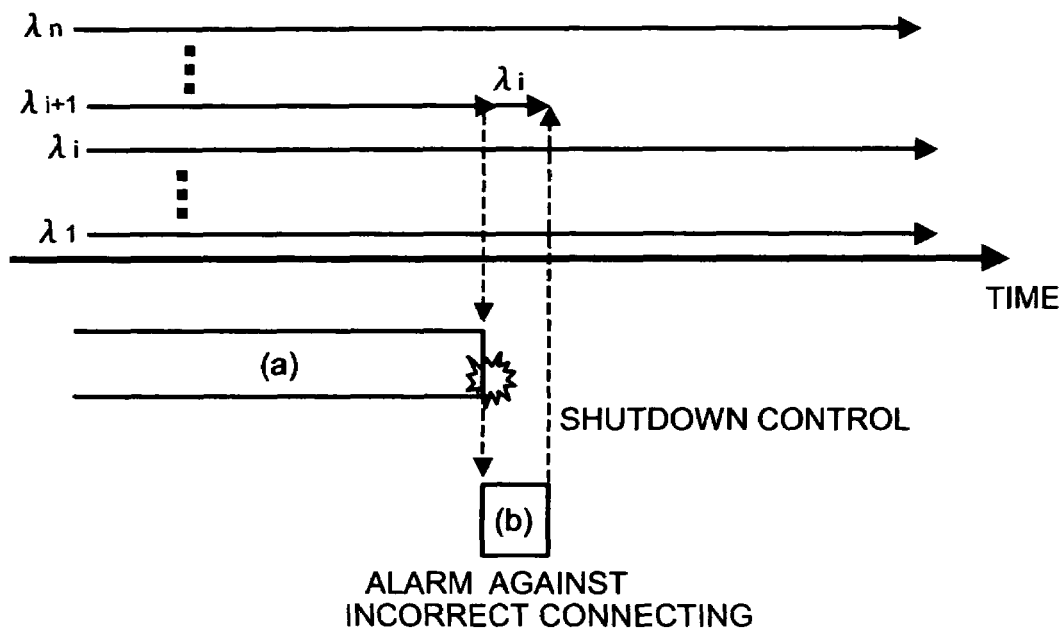
FIG. 8 is an explanatory diagram of measures to be taken according to the embodiment of the present invention in case the number of wavelengths is abnormal.

The first embodiment will be described in conjunction with FIG. 1, FIG. 3 to FIG. 5, FIG. 8, and FIG. 9. FIG. 1 is a block diagram of a wavelength-division multiplexing optical transmitter explanatory of the first embodiment of the present invention. FIG. 3 is a block diagram of a wavelength-division multiplexing optical receiver explanatory of the first embodiment of the present invention. FIG. 4 is an explanatory diagram of the first embodiment of the present invention showing an array of wavelengths to be handled in the wavelength-division multiplexing optical transmitter. FIG. 5 and FIG. 8 are explanatory diagrams of the first embodiment of the present invention showing measures to be taken in case the number of wavelengths is abnormal. FIG. 9 is an example of information stored in the wavelength-division multiplexing optical transmitter.

Referring to FIG. 1, a wavelength-division multiplexing optical transmitter 100 is an optical transmitter that combines n wavelengths of signals produced by n wavelength tunable optical transmitters 11. An optical coupler 24 combines signals of different wavelengths produced by the wavelength tunable optical transmitters 11, and places the resultant signal on a transmission line optical fiber 500. Taps 13 realized with optical couplers are interposed between the wavelength tunable optical transmitters 11 and the optical coupler 24, whereby part of each signal light is branched out. The branched signal light is detected by each of monitor photoreceivers 14, and sent to a signal processor 18. The signal processor 18 monitors the levels of signal light waves produced by the plurality of wavelength tunable optical transmitters 11, and counts the number of wavelengths by checking the presence or absence of signals having the respective wavelengths.

On the other hand, a tap 15 is connected to an output port 24b of the optical coupler 24 on the output stage of the optical coupler 24. Part of wavelength-multiplexed signal light is branched out, detected by a monitor photoreceiver array 17 via an AWG 16, and then sent to the signal processor 18. Herein, wavelengths to be separated by a demultiplexer 16 are wavelengths supposed to be combined by the optical coupler 24 and received by a wavelength-division multiplexing receiver that will be described later. The signal processor 18 monitors the levels of signal light waves having the respective wavelengths, and counts the number of wavelengths by checking the presence or absence of signals having the respective wavelengths that have been combined. Consequently, which of the wavelengths is placed on the transmission line optical fiber 500 can be detected.

The input ports 24a of the optical coupler 24 employed in a wavelength-division multiplexing unit included in the present embodiment cannot select a wavelength. Therefore, for example, if an optical transmitter to which a wavelength $\lambda i$ is assigned fails, a wavelength to be assigned to an auxiliary wavelength tunable optical transmitter is set to the wavelength $\lambda i$. An input electrical signal (not shown) to be routed to the optical transmitter that has failed is routed to the auxiliary wavelength tunable optical transmitter. Consequently, the auxiliary transmitter can substitute for the original optical transmitter.

A monitoring system on the output stage of the optical coupler 24 comprises the tap 15, AWG 16, and monitor photoreceiver array 17. AWDM channel monitor into which the tap, AWG, and monitor photoreceiver array are integrated is locally procurable and therefore may be adopted.

Signal light multiplexed by the wavelength-division multiplexing optical transmitter 100 is transmitted over the transmission line optical fiber 500, and received by a wavelength-division multiplexing optical receiver 200 shown in FIG. 3. The received wavelength-multiplexed signal is separated into signals of different wavelengths. The resultant signals are routed to output ports 22b of an AWG 22 associated with the respective wavelengths, and then received by respective optical receivers 21.

Figure 4A:
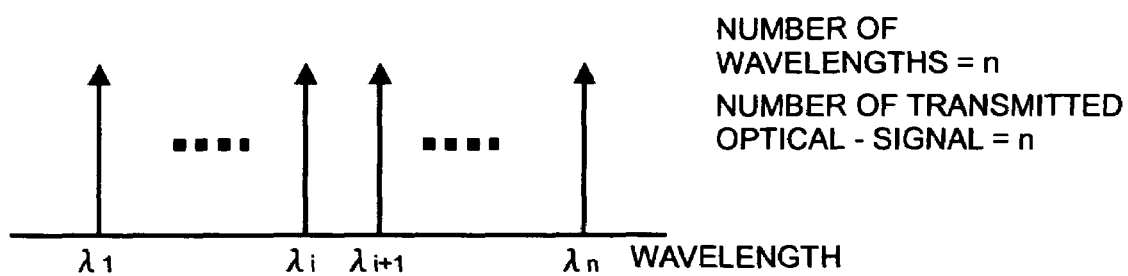
FIGS. 4(a) and 4(b) are explanatory diagrams showing an array of wavelengths to be handled in a wavelength-division multiplexing optical transmitter.
Figure 4B:
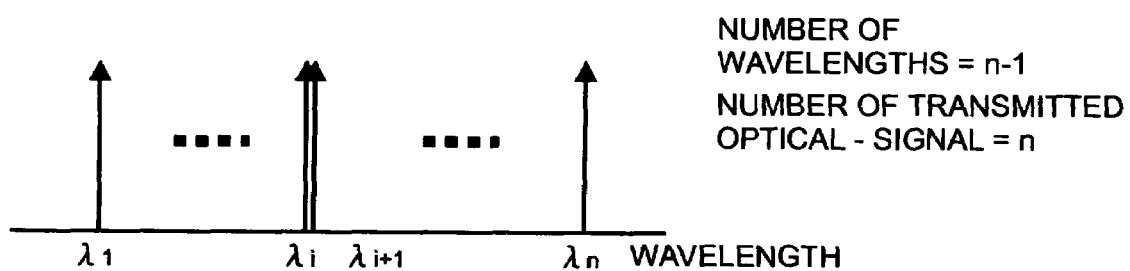
Figure 5:
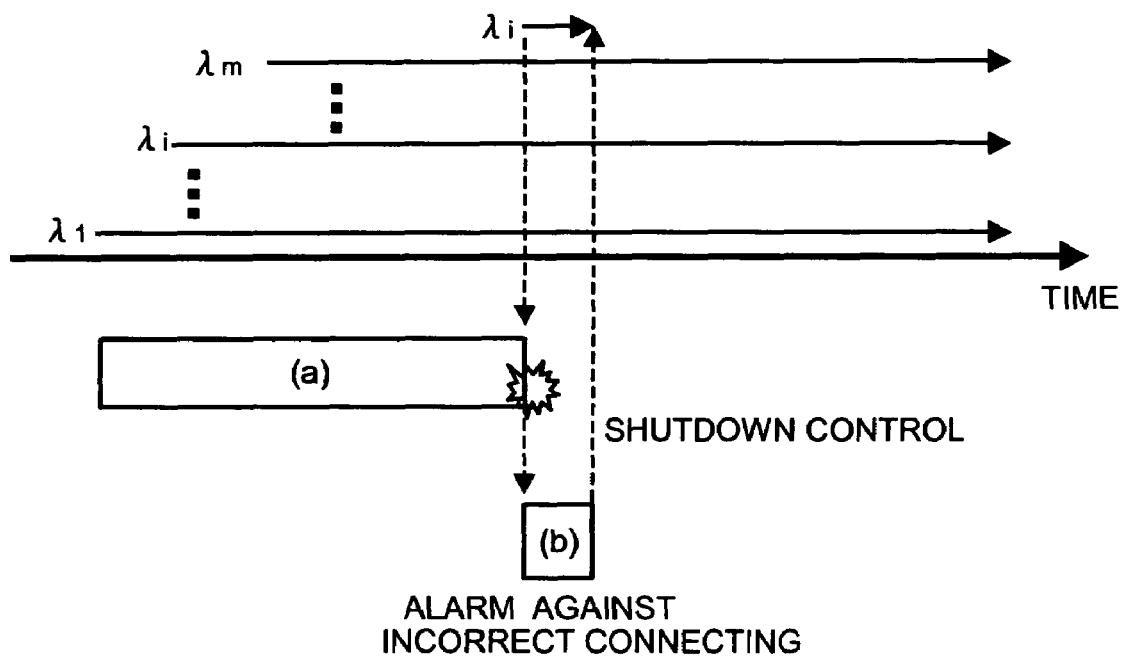
FIG. 5 is an explanatory diagram of measures to be taken according to the embodiment of the present invention in case the number of wavelengths is abnormal.

FIG. 4 shows an array of wavelengths of outputs of the wavelength-division multiplexing unit included in the present embodiment. FIG. 4(a) shows the array of normal wavelengths, wherein the wavelength tunable optical transmitters 11-1 to 11-n produce respective wavelengths $\lambda 1$ to $\lambda n$, and the wavelengths are combined. In this case, the number of combined wavelengths n is equal to the number of transmitted optical-signals n. In contrast, FIG. 4(b) shows a case where a wavelength $\lambda i+1$ is changed to the wavelength $\lambda i$ due to any of factors that a wavelength tunable transmitter which produces the wavelength λi+1 has failed, that an erroneous wavelength is designated, and that wavelength is routed to an incorrect port. This is attributable to the adoption of the wavelength-division multiplexing unit capable of combining any wavelengths out of all the wavelengths produced by the wavelength tunable optical transmitters (incapable of selecting a wavelength). In this case, the number of combined wavelengths n−1 is smaller by one than the number of transmitted optical-signals n. Consequently, signal light waves having the wavelength λi and being produced by two wavelength tunable optical transmitters reach the receivers 21 and are received simultaneously. This disables communication.

According to the present embodiment, if a wavelength to be routed is shifted to another as mentioned above, measures shown in FIG. 5 can be taken. In FIG. 5, the axis of the abscissa indicates elapse of time. Different wavelengths are added in order of wavelengths λ1, etc., λi, etc., and λm at regular intervals from a certain time instant. In this case, the number of optical-signals detected by the monitor photoreceivers 14 shown in FIG. 1 and counted by the signal processor 18 is equal to the number of combined wavelengths detected by the monitor photoreceiver array 17 and counted by the signal processor 18 so that a normal state (a) is monitored. Thereafter, a wavelength tunable optical transmitter 11-$m$+1 that should produce a wavelength λm+1 initiates transmission of a signal having the wavelength λi identical to the already used wavelength. In this case, the number of transmitted optical-signals m+1 detected by the monitor photoreceivers 14 and counted by the signal processor 18 is different from the number of combined wavelengths detected by the monitor photoreceiver array 17 and counted by the signal processor 18 so that an abnormal state (b) is detected. Consequently, the signal processor 18 gives an alarm to notify the occurrence of an abnormality.

Additionaly, the signal processor 18 time-sequentially records information in memory 30 at the timings at which the respective transmitters have transmitted optical signals. The signal processor 18 compares the information with a time instant at which the normal state changes to the abnormal state, and shuts down the wavelength tunable optical transmitter 11-$m$+1 that has produced the wavelength λi. Consequently, communication of the wavelength λi that has originally been used can be recovered quickly.

Incidentally, the signal processor 18 included in the present embodiment detects a signal level. Since the signal level of a signal having the combined wavelength λi is doubled in the abnormal state, the abnormal state can be detected from this viewpoint.

Furthermore, the memory 30 of the signal processor 18 may store setting information sent from a monitor control unit (omitted from the drawing) that monitors the wavelength-division multiplexing optical transmitter 100. The setting information shows which wavelength is assigned to each optical transmitters. Consequently, the setting information is compared with wavelengths detected by the monitor photoreceiver array 17, whereby an abnormality can be detected. The contents of the description made of a wavelength tunable transmitter can also apply to a case where an ordinary optical transmitter having a wavelength fixed is incorrectly connected. This is equivalent to a case where although the wavelength λi is already used as shown in FIG. 4 and FIG. 5, another wavelength-fixed optical transmitter (wavelength λi) is incorrectly connected.

FIG. 9 is an example of information stored in the memory 30. The column for ID 31 stores information for identifying each optical transmitter, so each line of FIG. 9 corresponds to a representative optical transmitter. The column for wavelength 32 stores wavelengths assigned to each optical transmitter. Wavelength 32 is set based on the information from the monitor control unit, or it is possible to set the wavelength as detected by the monitor photoreceivers 14. In this case the monitor photoreceivers 14 detect not only the power level of a light signal but also a wavelength thereof. The column for time 33 stores a time when each optical transmitter starts to transmit the optical signal. The column for state 34 stores the state of each optical transmitter. For example the column 34 shows whether an optical transmitter is transmitting an optical signal or not.

Using this information, signal processor 18 can decide which optical transmitter is a failure. For example, when the signal processor detects that the number of wavelengths detected by the monitor photoreceivers 14 and the number of wavelengths detected by the photoreceiver array 17 is not equal, signal processor 18 finds the TIME 33 which is nearest to the time at which the inconsistency occurred. Then the signal processor 18 determines that an optical transmitter identified by ID 31 which corresponds to the nearest TIME 33 as being the optical transmitter which is a failure. Another way to decide an abnormal optical transmitter is that signal processor 18 finds the wavelength 32 which is not detected by the photoreceiver array 17. Then, the signal processor 18 determined that an optical transmitter identified by ID 31 corresponds to the found wavelength 32 as being the optical transmitter which is a failure.

Next, measures to be taken when a wavelength is incorrectly designated while the wavelength-division multiplexing optical transmitter is in operation will be described in conjunction with FIG. 8. The axis of the abscissa in FIG. 8 indicates elapse of time. In a normal state, n wavelengths starting with a wavelength λ1 and ending with a wavelength λn are combined. After a certain time elapses, a wavelength assigned to the wavelength tunable optical transmitter 11-$i$+1 is incorrectly changed to the wavelength λ1. Consequently, the number of transmitted optical-signals detected by the monitor photoreceivers 14 and counted by the signal processor 18 becomes different from the number of combined wavelength n−1 detected by the monitor photoreceiver array 17 and counted by the signal processor 18 so that an abnormal state (b) is detected. Consequently, the signal processor 18 gives an alarm to notify the occurrence of an abnormality. Moreover, the signal processor 18 preserves in the aforesaid setting information storage unit, pieces of wavelength information on optical signals sent from the wavelength tunable optical transmitters 11. Therefore, the signal processor 18 shuts down the wavelength tunable optical transmitter 11-$i$+1 which is used to produce the wavelength λi+1 which is lost. Consequently, the deteriorated quality of a signal having the wavelength λ1 that has originally been used can be recovered quickly.

The measures to be taken in a case where a wavelength changes discretely have been described so far. Even when a wavelength gradually shifts from a wavelength λi+1 to a wavelength λ1 along with a time-passing change of a transmitter (whether the transmitter is of a wavelength tunable type or not), since the signal processor 18 monitors the levels of optical signals that are received by the monitor photoreceiver array 17 and that have respective wavelengths, the signal processor 18 can detect the wavelength shift by monitoring the signal level of an optical signal having the wavelength λi+1. Moreover, what is shut down may not be a wavelength tunable optical transmitter. For example, a variable attenuator 19 interposed between each of the wavelength tunable optical transmitters 11 and each of the input ports 24$a$ may be used to attenuate signal light. In this case, the signal processor may control each variable attenuator 19. The same applies to other embodiments.

According to the present embodiment, there is provided a wavelength-division multiplexing optical transmitter capable of controlling transmission of a signal, which has an erroneous wavelength because of incorrect routing or incorrect setting, for a short period of time. Moreover, the wavelength-division multiplexing optical transmitter can cope with a wavelength shift derived from a time-passing change.

Figure 6:
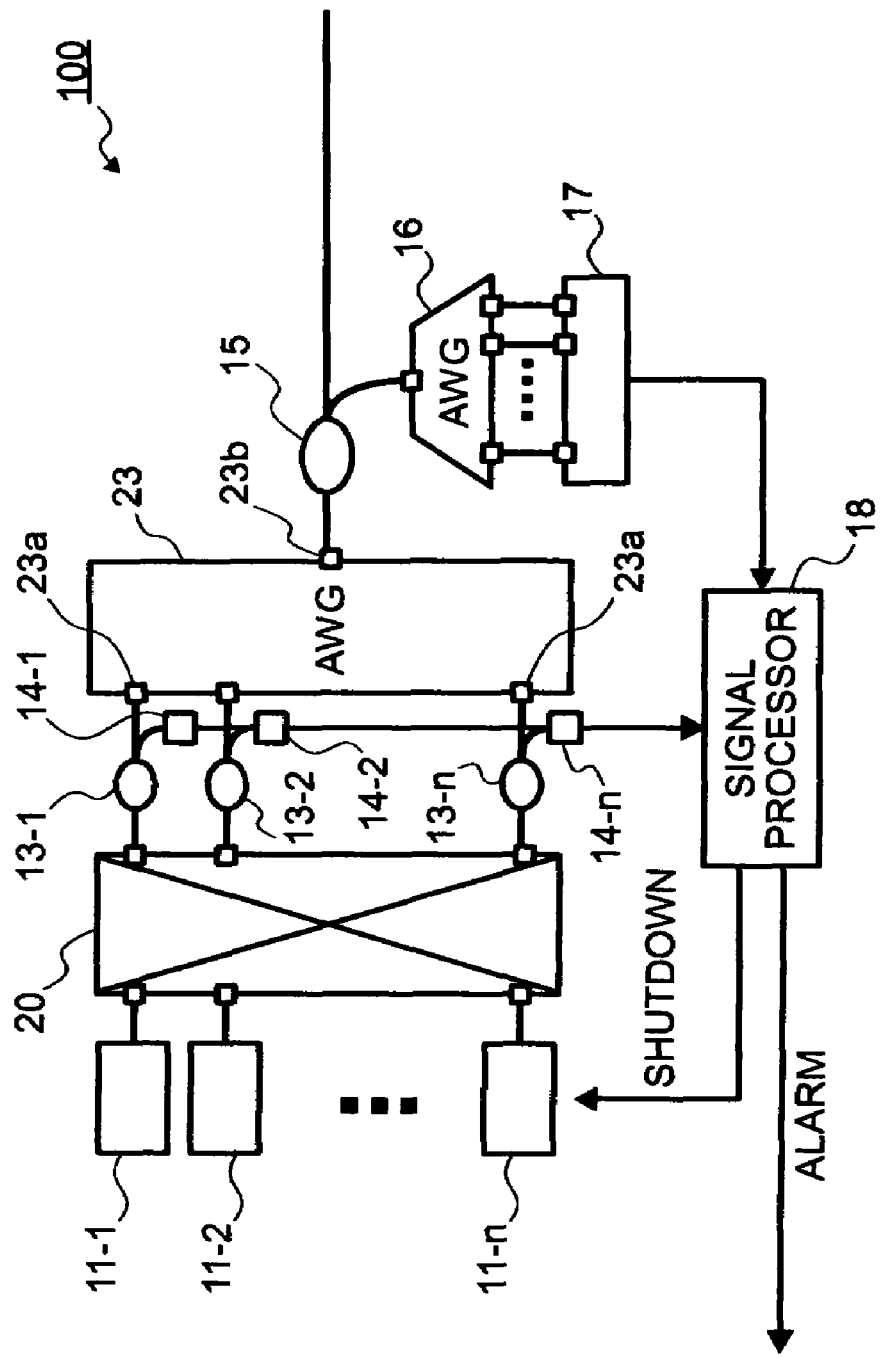
FIG. 6 shows a block diagram of the wavelength-division multiplexing optical transmitter explanatory of the embodiment of the present invention.
Figure 7A:
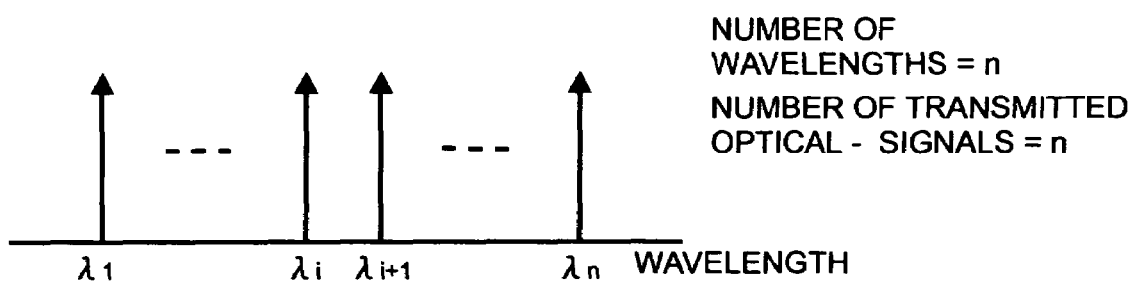
FIGS. 7(a) and 7(b) are explanatory diagrams of the embodiment of the present invention showing an array of wavelengths to be handled in the wavelength-division multiplexing optical transmitter.
Figure 7B:
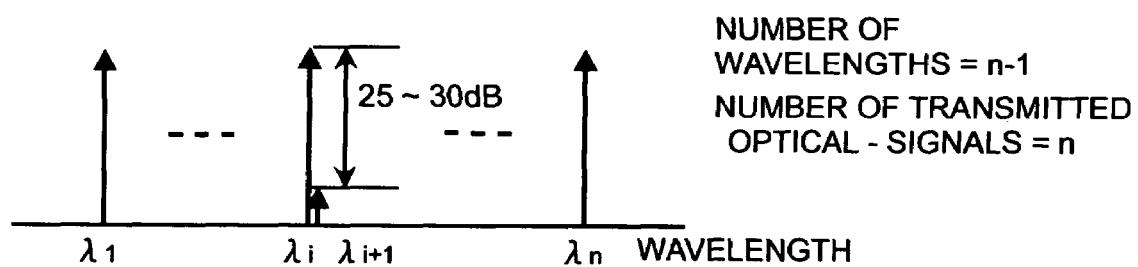

A second embodiment of the present invention will be described in conjunction with FIG. 6 and FIG. 7. FIG. 6 is a block diagram of a wavelength-division multiplexing optical transmitter explanatory of the embodiment of the present invention. FIG. 7 is an explanatory diagram of the embodiment of the present invention showing an array of wavelengths to be handled in the wavelength-division multiplexing optical transmitter.

In FIG. 6, a wavelength-division multiplexing optical transmitter 100 is an optical transmitter that combines n wavelengths produced by wavelength tunable optical transmitters 11-1 to 11-$n$. An AWG whose input ports 23$a$ can select a wavelength and which serves as a wavelength-division multiplexing unit combines any of wavelengths produced by the wavelength tunable optical transmitters 11, and places the resultant signal on a transmission light optical fiber 500. An n×n matrix optical switch 20 and taps 13-1 to 13-$n$ are interposed between the wavelength tunable optical transmitters 11 and the AWG 23. Parts of signal light waves branched out by the respective taps 13 are detected by monitor photoreceivers 14. The results of the detection are transmitted to a signal processor 18. The levels of signal light waves produced by the plurality of wavelength tunable optical transmitters 11 are monitored, and the number of wavelengths is counted by checking the presence or absence of signals having the respective wavelengths. The n×n matrix optical switch 20 switches signal light waves, which have n wavelengths and are produced by the wavelength tunable optical transmitters 11, according to a setting of a wavelength so that the signal light waves can be routed to the input ports 23$a$ of the AWG 23 associated with the wavelengths.

On the other hand, on the output stage of the AWG 23, a tap 15 is connected to an output port 23$b$ of the AWG 23, and part of wavelength-multiplexed signal light is branched out. The branched wavelength-multiplexed signal passes through an AWG 16, and is detected by a monitor photoreceiver array 17 and then transmitted to the signal processor 18. Wavelengths separated by the AWG 16 correspond to wavelengths that are supposed to be combined by the AWG 23. The signal processor 18 monitors the levels of signal light waves having the respective wavelengths, and counts the number of wavelengths by checking the presence or absence of the signals having the respective wavelengths that are combined. Consequently, whichever of the wavelengths is delivered to the transmission light optical fiber 500 can be detected.

The AWG 23 employed in a wavelength-division multiplexing unit included in the present embodiment can select a wavelength. Therefore, for example, if an optical transmitter to which a wavelength $\lambda 1$ is assigned fails, a wavelength to be assigned to an auxiliary wavelength tunable optical transmitter which is set to the wavelength $\lambda 1$. An input electrical signal (not shown) to be routed to the optical transmitter that has failed is routed to the auxiliary wavelength tunable optical transmitter. The associated setting of the optical switch 20 is changed accordingly. Consequently, the auxiliary wavelength tunable optical transmitter can be substituted for the original optical transmitter.

FIG. 7 shows an array of wavelengths of outputs of the wavelength-division multiplexing unit included in the present embodiment. FIG. 7($a$) shows the array of normal wavelengths, wherein the wavelength tunable optical transmitters 11-1 to 11-$n$ produce respective wavelengths $\lambda 1$ to $\lambda n$ that are combined. In this case, the number of combined wavelengths n detected by the monitor photoreceiver array 17 and counted by the signal processor 18 is equal to the number of transmitted optical-signals detected by the monitor photoreceivers 14 and counted by the signal processor 18. In contrast, FIG. 7($b$) shows the array of wavelengths attained in a case where two signals having a wavelength $\lambda i$ are routed due to any of the factors which cause a wavelength tunable optical transmitter which should produce a signal having a wavelength $\lambda i+1$ to fail so that an erroneous wavelength is designated, and that any of the settings of the n×n matrix optical switch 20 is determined incorrectly (e.g., a wavelength is routed to an incorrect port). This is a phenomenon likely to occur in a configuration that includes a matrix optical switch and a wavelength-division multiplexing unit capable of selecting a wavelength for the purpose of combining any of wavelengths produced by wavelengths tunable optical transmitters. In this case, the number of combined wavelengths n detected by the monitor photoreceiver array 17 and counted by the signal processor 18 is smaller by 1 than the number of optical-signals detected by the monitor photoreceivers 14 and counted by the signal processor 18. Since the AGW 23 that combines wavelengths can select a wavelength, if a signal having an erroneous wavelength is routed to the AGW 23, the wavelength is decreased by a magnitude ranging from about 25 dB to about 30 dB, and then delivered to the transmission line optical fiber 500. If a transmission distance is short, signal light waves having the wavelength $\lambda i$ and being produced by two wavelength tunable optical transmitters reach receivers. In this case, the two signal light waves interfere with each other, and a signal that should be received is covered with noise (coherent crosstalk). This deteriorates communication quality. In order to maintain normal quality, the ratio of the signal levels of signal light and interference light must be retained at a level of 35 dB or less. If the ratio of the signal levels ranges from about 25 dB to about 30 dB, it poses a problem.

If an erroneous wavelength is designated as mentioned above, the measures described in conjunction with FIG. 5 or FIG. 8 can be taken in the same manner as they are in the first embodiment. Moreover, even if a wavelength gradually shifts from a value $\lambda i+1$ to a value $\lambda i$ due to degradation of a transmitter, since the signal processor 18 monitors the signal levels of signal light waves having respective wavelengths and being received by the monitor photoreceiver array 17, the signal processor 18 can detect the wavelength shift by monitoring the signal level of signal light having the wavelength $\lambda i+1$.

According to the present embodiment, since a wavelength-division multiplexing unit capable of selecting a wavelength is employed, when a wavelength assigned to a wavelength tunable transmitter is changed to another, a port of an optical switch to which the wavelength is routed must be changed. This is comparable to, for example, a case where one of the transmitters fail. In the foregoing embodiment, the transmitters are all wavelength tunable transmitters. Alternatively, wavelength-fixed transmitters and wavelength tunable transmitters may be used in combination. Moreover, the optical switch 20 may be interposed between the taps 13 and AWG 23.

According to the present embodiment, there is provided a wavelength-division multiplexing optical transmitter that can shorten the period of time of transmission of a signal, which has an erroneous wavelength due to incorrect routing or incorrect setting. Moreover, the wavelength-division multiplexing optical transmitter can cope with a wavelength shift stemming from a time-passing change.

The employment of wavelength tunable optical transmitters can drastically reduce the number of auxiliary optical transmitters that conventionally are required in the same number as the number of wavelengths. Moreover, a highly efficient and reliable optical network can be constructed by routing wavelengths using an optical switch or an optical filter or flexibly changing settings of light paths according to a future change or growth in the configuration of a network. There is a high possibility that the present invention may be utilized as the fundamentals of a wavelength-division multiplexing optical network industry employing the wavelength tunable optical transmitter. According to the present invention, incorrect connection of an optical transmitter is detected, and the result of the detection is delivered as an alarm and thus reported to a network manager. Consequently, there is provided a highly reliable wavelength-division multiplexing optical transmitter that will never adversely affect existing lines.

The invention claimed is:

1. An optical transmission apparatus comprising:
    a memory for storing a time when each optical transmitter starts to transmit an optical signal;
    optical transmitters for transmitting optical signals;
    first monitor units for monitoring optical signals from the optical transmitters;
    a multiplexer for multiplexing the optical signals from the optical transmitter into a multiplexed signal;
    a second monitor unit for monitoring each optical signal which is multiplexed in the multiplexed signal from the multiplexer; and
    a processing unit for detecting an overlap in wavelength of transmitted optical signals according to a result of monitoring of the first and the second monitor units;
    wherein the processing unit determines which one of the optical transmitters whose time is stored in the memory has a time which is nearest to the time when the overlap was detected as an indication of a failure of the one of the optical transmitter.

2. The optical transmission apparatus according to claim 1, wherein the second monitor unit comprises:
    a branching unit for branching a part of the multiplexed signal;
    a demultiplexer for demultiplexing the multiplexed signal from the branching unit into optical signals of different wavelengths; and
    a monitor array for detecting each optical signal demultiplexed by the demultiplexer.

3. The optical transmission apparatus according to claim 1, wherein the processing unit detects the overlap by comparing a first number of optical signals as monitored by the first monitor units and a second number of optical signals as monitored by the second monitor unit.

4. The optical transmission apparatus according to claim 1, wherein the processing unit stops the one of the optical transmitters which is determined from transmitting the optical signal.

5. The optical transmission apparatus according to claim 1, further comprising:
    variable attenuators disposed between the optical transmitters and the multiplexer for enabling interception of the optical signals from the optical transmitters so as to prevent receipt by the multiplexer;
    wherein the processing unit enables one of the variable attenuators to intercept the optical signal transmitted by the one of the optical transmitters.

6. The optical transmission apparatus according to claim 1, wherein the optical transmitters are at least initially set to transmit optical signals having different wavelengths from one another.

7. The optical transmission apparatus according to claim 6, wherein at least one of the optical transmitters enables changing of a wavelength of an output optical signal thereof.

* * * * *